US009435110B2

(12) United States Patent
Rohrer et al.

(10) Patent No.: US 9,435,110 B2
(45) Date of Patent: Sep. 6, 2016

(54) BACK-PRESSURE SAFEGUARD

(71) Applicant: Lasso Technik AG, Basel (CH)

(72) Inventors: Daniel Rohrer, Basel (CH); Roger Waser, Ennetbürgen (CH)

(73) Assignee: Lasso Technik AG, Basel (CH)

( * ) Notice: Subject to any disclaimer, the term of this patent is extended or adjusted under 35 U.S.C. 154(b) by 77 days.

(21) Appl. No.: 14/291,046

(22) PCT Filed: Nov. 29, 2012

(86) PCT No.: PCT/EP2012/073946
§ 371 (c)(1),
(2) Date: May 30, 2014

(87) PCT Pub. No.: WO2013/079587
PCT Pub. Date: Jun. 6, 2013

(65) Prior Publication Data
US 2014/0290777 A1    Oct. 2, 2014

(30) Foreign Application Priority Data
Dec. 1, 2011    (CH) ..................................... 1911/11

(51) Int. Cl.
*F16K 15/14*    (2006.01)
*E03F 7/04*    (2006.01)

(52) U.S. Cl.
CPC .............. *E03F 7/04* (2013.01); *F16K 15/145* (2013.01); *F16K 15/147* (2013.01); *Y10T 137/788* (2015.04)

(58) Field of Classification Search
CPC .................... Y10T 137/7891; Y10T 137/788; E03F 7/04; F16K 15/145; F16K 15/147
USPC .................................................. 137/510–530
See application file for complete search history.

(56) References Cited

U.S. PATENT DOCUMENTS

| 2,910,996 | A | * | 11/1959 | Coover | ................... | F16L 37/50 |
| | | | | | | 137/377 |
| 3,882,891 | A | * | 5/1975 | Viles | ..................... | F16K 15/145 |
| | | | | | | 137/512.15 |
| 4,063,570 | A | * | 12/1977 | Mitchell | ............... | F16K 15/031 |
| | | | | | | 137/454.2 |
| 4,098,287 | A | | 7/1978 | Baumbach | | |
| 5,755,263 | A | * | 5/1998 | Jang | ...................... | F16K 15/145 |
| | | | | | | 137/454.2 |
| 5,769,125 | A | | 6/1998 | Duer et al. | | |
| 6,585,005 | B1 | * | 7/2003 | Raftis | ................... | F16K 15/147 |
| | | | | | | 137/846 |
| 8,662,104 | B2 | * | 3/2014 | Hansmann | ............ | A61M 16/20 |
| | | | | | | 137/493 |
| 2010/0319784 | A1 | * | 12/2010 | Kuhne | ................... | G05D 7/012 |
| | | | | | | 137/12 |
| 2011/0108139 | A1 | * | 5/2011 | Wright | .................. | F16K 15/147 |
| | | | | | | 137/511 |
| 2011/0132474 | A1 | * | 6/2011 | Reese | ....................... | E03F 7/04 |
| | | | | | | 137/487.5 |
| 2011/0211974 | A1 | * | 9/2011 | Harper | .................. | F04B 53/106 |
| | | | | | | 417/53 |

FOREIGN PATENT DOCUMENTS

WO        WO 01/50048 A1    7/2001

* cited by examiner

*Primary Examiner* — Jessica Cahill
(74) *Attorney, Agent, or Firm* — Hammer & Associates, P.C.

(57) ABSTRACT

The backflow prevention device consists of a funnel-shaped membrane and a clamping device for mounting in a pipe. The clamping device consists of a spread member expanding the membrane to the pipe cross section and pressing it against the pipe wall, and a support member supporting the spread member against the pipe wall.

7 Claims, 1 Drawing Sheet

BACK-PRESSURE SAFEGUARD

The invention relates to a backflow prevention device according to the preamble of the independent claim 1.

Backflow prevention devices are utilized to prevent undesired flow reversal in pipe work. A typical field of application is building drainage, where drain points are located below backflow level. When outside of the building the water level rises in the drainage system due to floodwaters, without backflow prevention device water would press into the building and, in the worst case, rise up to backflow level which could eventually be even above ground level of the first floor. There is a variety of further application fields known to those skilled in the art.

As for backflow prevention devices it is differentiated between active systems where a pipe is being opened or closed by a driven shutting device and passive systems where opening or closing of the pipe solely takes place due to the pressure difference before and after the prevention device. Object of the present application is a passive backflow prevention device.

For the purpose of this application the term "inside" designates that side of the backflow prevention device from which the liquid flow to be discharged comes in, and the term "outside" designates that side from which a potential backflow may occur and which the prevention device should shut off.

Previously the most common and today still utilized form of backflow prevention devices for pipes is a flap gate attached to the pipe via a hinge such as to being capable of opening outwardly, to allow effluent passing from the inside to the outside, and, upon backflow, to be pressed against the pipe ending or a flange in the pipe and thus shutting off the pipe. This type of backflow prevention devices has a variety of disadvantages so that it is increasingly replaced by a different type, consisting of a pipe and a one-way flow-through type elastomeric element.

A typical such device is described in U.S. Pat. No. 5,769,125 and is manufactured and distributed by Red Valve Company, Inc. under the labels Tide-flex® and Check-Mate™. This backflow preventing device consists of an elastomeric element having the internal form of a cylindrical sleeve and extending to the outside and ending into a form indicated as bill, with the upper half of the sleeve being folded against the lower half. The cylindrical sleeve is manufactured fitting exactly to the pipe to be secured and is fixed in various ways at or in the pipe. In the absence of backflow pressure from outside the bill is opened by low pressure from inside, e.g. from sewage, such that the sewage can drain off. Backflow pressure closes the bill and prevents backflow.

Although this backflow prevention device constitutes a major advantage over said flap gates, it shows some disadvantages. One disadvantage is the requirement of an exact-fit manufacture for each application or, in case one dimension of the backflow prevention device is to be implemented for several pipe cross sections, the differences of the outer diameters of the backflow prevention devices need to be filled up with sealant. In any case a considerable part of the pipe cross section is lost with the consequence of a higher pressure loss. Another disadvantage is that fastening, when implementing inside the pipe, is rather complicated. Yet another disadvantage is the complex constructive design required to prevent the bill from flapping into the inside.

From WO-01/50048 a similar backflow prevention device comprising an elastomeric element is known, whereas the outside shutter is not formed by a bill but by an edge or lip fitted to the pipe wall. With this solution the danger of averting into the inside is lower than for the bill-shaped formation, so that the elastomeric element can be of simpler design. However, also this backflow preventing device needs to be manufactured to exactly fit the pipe cross section or, like in the preceding solution, to be fitted by sealant, which likewise leads to a loss of cross section.

The invention has the object of providing a passive backflow prevention device without exhibiting the disadvantages of known devices. Particularly the backflow prevention device should be adaptable to various pipe cross sections and be readily installable or replaceable.

According to the invention this object is solved by the characterizing attributes of claim 1. In the following a preferred embodiment of the invention is described by means of the enclosed drawings.

Figure 1:
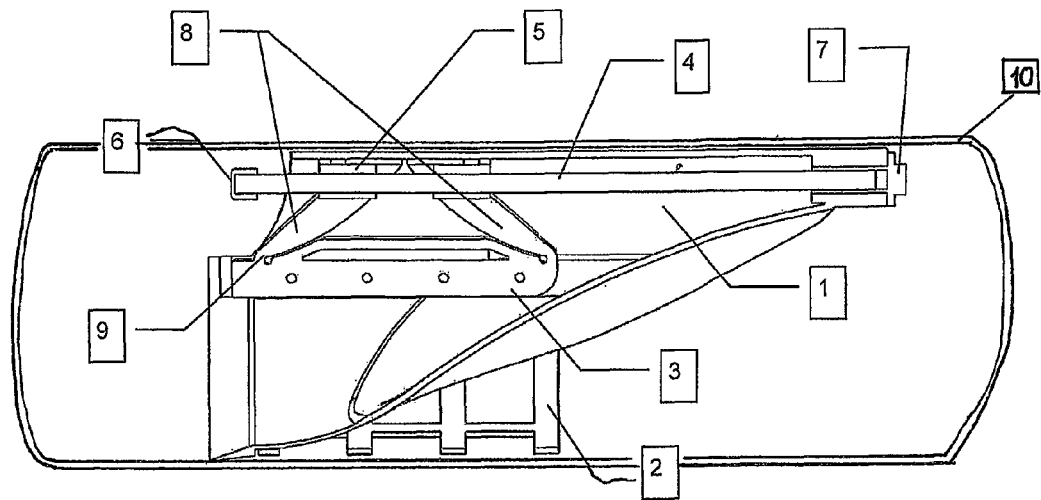
FIG. 1 shows an axial section through a backflow prevention device

The backflow prevention device shown in FIG. 1 in the axial plane section consists of an elastomeric element 1, hereinafter referred to as membrane, and a clamping device. The backflow prevention device is suited to be inserted into the inside of a pipe, whereas the clamping device serves to adapt to the inner diameter of the pipe and to wedge the backflow prevention device in the pipe.

Figure 3:
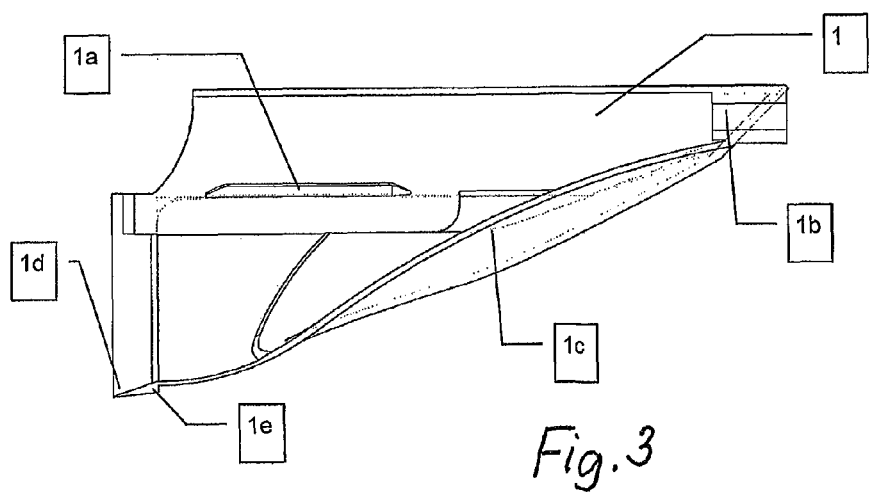
FIG. 3 shows an axial section through the elastomeric element of the backflow prevention device according to FIG. 1.

As shown in FIG. 3, the membrane has approximately the form of a comet with an opening shown in the left part of the drawing, which, in the inserted state, is directed outwards, and a closed side shown in the left part of the drawing, which, in the inserted state, is directed inwards. The membrane consists of one piece but an upper part and a lower part can be seen fulfilling different functions.

The upper part of the membrane has static functions and serves mainly to adapt to the pipe cross section and for mounting in the pipe by means of the clamping device by which the upper part of the membrane is pressed against the pipe inner wall. The compression also causes sealing of the upper area of the pipe. This sealing effect intensifies in case of backflow caused by back pressure from the outside pressing the upper part of the membrane upwards against the pipe wall.

On the upper part of the membrane ribs 1a are formed as a stopper to prevent the membrane material from being drawn from the bottom to the top when clamping or extending the clamping device.

On the closed end of the membrane the upper part passes into a solid end piece in which there is a through-hole 1b for the clamping screw 4 to be described.

The lower part of the membrane has a dynamic function, i.e. it performs the opening for flow from the inside to the outside and the closing when there is no flow or when back pressure develops. The outer margin of the lower part is formed as sealing lip 1d comprising a thin edge. Upon clamping the membrane onto the pipe cross section by means of the clamping device the sealing lip loosely resting on the lower part of the clamping device receives a certain initial load, improving the sealing effect.

Behind the sealing lip a shoulder 1e is formed resting on the lower part of the clamping device to be described and routing the forces occurring upon back pressure into the pipe wall and, upon high overload, preventing shearing of the lower membrane part inwards.

The lower part of the membrane has a preformed notch 1c directed towards the axis and promoting opening and which can be appropriately reinforced for higher backflow pressures.

Figure 2:
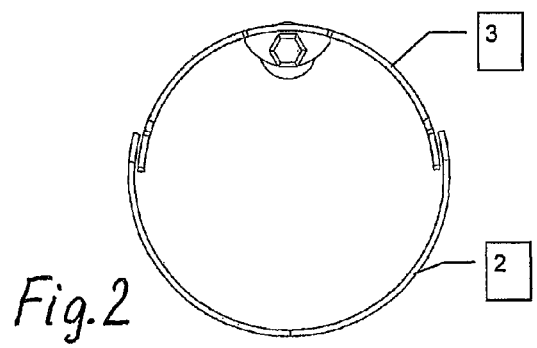
FIG. 2 shows a top view of the clamping device for fastening in a pipe

As can be seen from FIG. 2 the clamping device consists of an upper part 3 and a lower part 2 overlapping in opposing areas. The clamping device is joined with the membrane in a way that both the upper part and the lower part 2 of the clamping device 3 are arranged below the membrane, respectively, the membrane thus passing through the overlapping area between both parts of the clamping device and being joined with the clamping device, e.g. by riveting, bolting etc.

The upper part 3 of the clamping device serves as a spread member to extend the backflow prevention device onto the respective pipe cross section and basically consists of the straight flat members overlapping with the lower part, between which bows 8, formed depending on the bending of the pipe wall, extend being inclined in relation to another. At the uppermost points of the bows thread blocks 5 with internal threads are being attached, one of which is a right-hand thread and the other a left-hand thread. Through the thread a clamping screw extends also having either a right-hand thread or a left-hand thread. The clamping screw also extends through the opening 1b of the membrane and has a tool attachment point at the end, e.g. a hexagon 7. The other end of the screw also has a tool attachment point 6. By turning the screw the thread blocks and thus bows 8 are drawn closer to one another by which the circumference of the clamping device is reduced, or dislodged from one another by which the circumference is increased. Moving of the legs is promoted by pivot points 9 formed at the transition from the flat members to the legs 8 by material reduction.

Upon extending the circumference by spreading apart the bows, at the same time the bow edges are set on edge whereby the bow edges press stronger into the membrane material and add to the pressing effect.

The lower part 2 of the clamping device serves as a support member for the upper part or spread member and consists of a straight flat member overlapping with the upper part, and clamps extending here from, being curved approximately corresponding to the curvature of the pipe and fitting to it, being joined at their ends with one another. Upon high backflow pressures the clamps can serve as additional stoppers for the shoulder of the lower part of the membrane. Additionally, a further shoulder or knobs can be attached to the membrane as stopper.

For mounting the backflow prevention device is inserted into the pipe to be secured at the desired location and the clamping screw is fastened so that axial movement of the backflow prevention device is still possible. Then final positioning is carried out and the clamping screw is tightened with a torque wrench. The torque is chosen as to achieve a frictional connection capable of receiving a multiple of the expected backflow pressure.

The expandable clamping device can also be used without membrane for fastening of insert members etc. in pipes. For such an application upper part and lower part are permanently fixed to one another or they are fabricated as one piece.

The invention claimed is:

1. A backflow prevention device consisting of an elastomeric element to be arranged in an interior of a pipe and a clamping device for securing the elastomeric element in the pipe,
the elastomeric element having a shape of a conical bag with an open end to be arranged in the pipe toward the backflow, and a closed end,
the clamping device comprising
a support portion arranged radially outside the open end of the elastomeric element and being supported by the pipe and
a spread portion being supported by the support portion and being arranged inside the open end, the spread portion comprising a screw mechanism to increase a circumference of the clamping device, thereby pressing a respective portion of the elastomeric element towards the pipe.

2. The backflow prevention device according to claim 1 further comprising a sealing lip at the open end of the elastomeric element.

3. The backflow preventing device according to claim 1 wherein the elastomeric element has a shoulder behind the clamping device which serves as a stopper.

4. The backflow preventing device according to claim 1 wherein the spread portion comprises bows angularly inclined against each other and a screwing mechanism changing the distance between the bows thereby causing an increase or decrease of the circumference of the clamping device.

5. The backflow preventing device according to claim 4 wherein the screwing mechanism comprises thread blocks and a clamping screw with right and left handed threads extending through the thread blocks for moving the thread blocks toward or away from each other.

6. A clamping device for the backflow prevention device according to claim 1 comprising an expandable spread portion and a support portion supporting the spread portion against a pipe wall.

7. The clamping device according to claim 6 wherein the spread portion comprises inclined bows and a spreading mechanism moving the bows apart from each other and thereby expanding the circumference of the clamping device.

* * * * *